United States Patent
Jin et al.

(10) Patent No.: US 12,468,426 B2
(45) Date of Patent: Nov. 11, 2025

(54) TOUCH DISPLAY PANEL AND METHOD FOR MEASURING TOUCH POINT THEREOF

(71) Applicant: WUHAN CHINA STAR OPTOELECTRONICS SEMICONDUCTOR DISPLAY TECHNOLOGY CO., LTD., Wuhan (CN)

(72) Inventors: Zengjian Jin, Wuhan (CN); Yalong Ma, Wuhan (CN)

(73) Assignee: WUHAN CHINA STAR OPTOELECTRONICS SEMICONDUCTOR DISPLAY TECHNOLOGIES CO., LTD., Wuhan (CN)

(*) Notice: Subject to any disclaimer, the term of this patent is extended or adjusted under 35 U.S.C. 154(b) by 0 days.

(21) Appl. No.: 17/618,945

(22) PCT Filed: Nov. 30, 2021

(86) PCT No.: PCT/CN2021/134202
§ 371 (c)(1),
(2) Date: Dec. 14, 2021

(87) PCT Pub. No.: WO2023/087382
PCT Pub. Date: May 25, 2023

(65) Prior Publication Data
US 2024/0061528 A1 Feb. 22, 2024

(30) Foreign Application Priority Data
Nov. 19, 2021 (CN) .......................... 202111373156.0

(51) Int. Cl.
*G06F 3/041* (2006.01)
*G06F 3/044* (2006.01)

(52) U.S. Cl.
CPC ........ *G06F 3/04186* (2019.05); *G06F 3/0446* (2019.05); *G06F 2203/04104* (2013.01)

(58) Field of Classification Search
CPC ....... G06F 3/041–047; G06F 2203/041–04114
See application file for complete search history.

(56) References Cited

U.S. PATENT DOCUMENTS

| | | | |
|---|---|---|---|
| 11,042,242 B2 * | 6/2021 | Nakaya | G06F 3/0418 |
| 2009/0251429 A1 * | 10/2009 | Hung | G06F 3/04164 345/173 |

(Continued)

FOREIGN PATENT DOCUMENTS

| | | |
|---|---|---|
| CN | 102023767 A | 4/2011 |
| CN | 103336635 A | 10/2013 |

(Continued)

OTHER PUBLICATIONS

Chinese Office Action issued in corresponding Chinese Patent Application No. 202111373156.0 dated Apr. 12, 2023, pp. 1-12.

(Continued)

*Primary Examiner* — Roberto W Flores
(74) *Attorney, Agent, or Firm* — PV IP PC; Christopher S. Ruprecht; Wei Te Chung

(57) ABSTRACT

A touch display panel and method for measuring touch points are provided. The coordinate of each of touch points located in a first sub-display region and a second sub-display region can be measured by a first touch chip and a second touch chip respectively. When it is necessary to use the coordinates of the touch points located in the second sub-display region for joint calculation for obtaining the coordinates of the touch points located in the first sub-display region, the data can all be obtained through the first touch chip. When it is necessary to use the coordinates of the touch points located in the first sub-display region for joint calculation for obtaining the coordinates of the touch points (Continued)

located in the second sub-display region, the data can all be obtained through the second touch chip, thereby ensuring the unity of data sources, and increasing data accuracy.

17 Claims, 7 Drawing Sheets

(56) References Cited

U.S. PATENT DOCUMENTS

| | | | | |
|---|---|---|---|---|
| 2009/0284494 | A1* | 11/2009 | Hung | G06F 3/044 345/174 |
| 2015/0116256 | A1* | 4/2015 | Hsu | G06F 3/04166 345/174 |
| 2016/0092023 | A1* | 3/2016 | Nakaya | G06F 3/0418 345/173 |
| 2016/0170513 | A1 | 6/2016 | Lee et al. | |
| 2016/0195986 | A1* | 7/2016 | Kwon | G06F 3/0488 345/174 |
| 2017/0003814 | A1 | 1/2017 | Park | |

FOREIGN PATENT DOCUMENTS

| | | |
|---|---|---|
| CN | 104423705 A | 3/2015 |
| CN | 104598087 A | 5/2015 |
| CN | 104750330 A | 7/2015 |
| CN | 109388290 A | 2/2019 |
| CN | 111667791 A | 9/2020 |
| WO | 2017054681 A1 | 4/2017 |

OTHER PUBLICATIONS

International Search Report in International application No. PCT/CN2021/134202,mailed on Aug. 16, 2022.
Written Opinion of the International Search Authority in International application No. PCT/CN2021/134202,mailed on Aug. 16, 2022.

* cited by examiner

TOUCH DISPLAY PANEL AND METHOD FOR MEASURING TOUCH POINT THEREOF

CROSS REFERENCE

This application is a US national phase application based upon an International Application No. PCT/CN2021/134202, filed on Nov. 30, 2021, which claims the priority of Chinese Patent Application No. 202111373156.0, entitled "TOUCH DISPLAY PANEL AND METHOD FOR MEASURING TOUCH POINT THEREOF", filed on Nov. 19, 2021, the disclosure of which is incorporated herein by reference in its entirety.

FIELD OF THE DISCLOSURE

The application relates to a field of display technology, and in particular to a touch display panel and a method for measuring touch points thereof.

BACKGROUND

With the continuous increase in size and resolution of touch display panels, many large-size and high-resolution display panels are no longer limited to using a single touch chip to collect coordinates of touch points on one display panel due to the limitation of the number of pixels of the display panel, the manufacturing complexity, and the driving ability, but two or more touch chips are used to collect coordinates of touch points on different region of the display panels instead.

Since the coverage area of one finger is much larger than the area of a single touch point, when a finger touches a single touch point, small changes in capacitance will occur on other touch points around the single touch point. Therefore, in order to improve the collection accuracy of coordinates of touch points, the coordinate of a certain touch point generally needs to be calculated according to the changes in the capacitance values corresponding to the certain touch point itself and other touch points around it. That is, the final change in the capacitance value corresponding to the certain touch point is determined according to the change in the capacitance value corresponding to the certain touch point and the average of the sum of the changes in the capacitance values corresponding to other touch points around the certain touch point, thereby determining the coordinate of the certain touch point. Therefore, when a coordinate of a touch point in the adjacency region of the different regions of the display panel corresponding to the two touch chips is calculated, one of the touch chips is required to collect the change in the capacitance value corresponding to the touch point, the other of the touch chips is also required to collect the change in the capacitance value corresponding to the touch point. FIG. 1 is a schematic structural diagram of a self-capacitive touch display panel in prior arts. FIG. 2 is a schematic structural diagram of a double-layer mutual-capacitive touch display panel in prior arts. FIG. 3 is a schematic structural diagram of a single-layer mutual-capacitive touch display panel in prior arts. Referring to FIG. 1, FIG. 2, and FIG. 3, coordinates in a region A are collected by a touch chip TIC-A, and coordinates in a region B are collected by a touch chip TIC-B. A coordinate of a point A2 is obtained according to an average of changes in capacitance values of a point A1, the point A2, and a point B2. However, due to the difference in the process and performance between the two touch chips, the difference in the environment, and the difference between the driving voltages, there will be different errors when changes in capacitance values corresponding to touch points are collected. Thus, a coordinate of a touch point in the adjacency region will be inaccurate due to the difference in the collection errors between the two touch chips. In the other words, due to the difference in the collection errors between the touch chip TIC-A and the touch chip TIC-B, the error of the coordinate of the point A2 obtained by the touch chip TIC-A is different from the error of the coordinate of the point B2 obtained by the touch chip TIC-B, so the obtained coordinate of A2 is inaccurate, which will reduce the touch accuracy and the touch linearity of the touch display panel. In addition, it may be that the display panel needs to be bent in the adjacency region, which easily makes the measurement of the touch point coordinates at the adjacent location inaccurate. Thus, if the coordinates of the touch points at the adjacency region are measured by only one chip, it may not be corrected if the measurement of the chip is inaccurate.

Thus, it is desired to provide a touch display panel and a method for measuring touch points thereof, so that when different touch chips are used to measure coordinates of touch points in different region of the touch display panel, inaccuracy of coordinate collection of the touch points in an adjacency region between the different regions of the touch display panel, which is induced by different errors of the different touch chips, can be modified.

SUMMARY

The present disclosure provides a touch display panel and a method for measuring touch points thereof, which can modify inaccurate of coordinate collection of touch points in an adjacency region of the touch display panel which is induced by different errors of different touch chips.

In a first aspect, an embodiment of the present disclosure provides a touch display panel comprising a first display region and a second display region adjacently arranged, a touch layer, and at least two touch chips. The first sub-display region located in the first display region is adjacent to a second sub-display region located in the second display region. The touch layer comprises a plurality of touch electrodes. The plurality of touch electrodes are located in the first display region and the second display region. A first touch chip is connected to the touch electrodes located in the first display region and the second sub-display region respectively. The second touch chip is connected to the touch electrodes located in the second display region and the first sub-display region respectively.

Optionally, the touch display panel is a self-capacitive touch display panel.

Optionally, the plurality of touch electrodes comprises first touch electrodes, the first touch chip is connected to the first electrodes located in the first display region and the second sub-display region respectively, the second touch chip is connected to the first electrodes located in the second display region and the first sub-display region respectively.

Optionally, the touch display panel is a mutual-capacitive touch display panel.

Optionally, the plurality of touch electrodes further comprises second touch electrodes, mutual-capacitive touch capacitances are formed between the first touch electrodes and the second touch electrodes, each of the second touch electrodes is coupled to at least one of the first touch chip and the second touch chip.

Optionally, the touch display panel is a double-layer mutual-capacitive touch display panel.

Optionally, the first touch electrodes and the second touch electrodes are arranged in different layers, the first touch electrodes and the second touch electrodes are arranged in a crossing pattern, each of the second touch electrodes is electrically connected to the first touch chip and the second touch chip.

Optionally, the touch display panel is a single-layer mutual-capacitive touch display panel.

Optionally, the first touch electrodes and the second touch electrodes are arranged in the same layer, the first touch chip is further connected to the second touch electrodes located in the first display region, the second touch chip is further connected to the second touch electrodes located in the second display region.

Optionally, the first sub-display region and the second sub-display region are flexible display regions, the touch electrodes located in the first sub-display region and the second sub-display region are flexible.

In a second aspect, an embodiment of the present disclosure provides a method for measuring touch points, applied to the above touch display panel. The method comprises: through a first touch chip, obtaining changes in capacitance values corresponding to touch points located in a first display region and a second sub-display region, and through a second touch chip, obtaining changes in capacitance values corresponding to touch points located in a second display region and a first sub-display region; obtaining actual changes in the capacitance values of the touch points located in the first sub-display region according to the changes in the capacitance values corresponding to the touch points located in the first sub-display region which are obtained by the first touch chip and the second touch chip respectively; and determining a coordinate of a target touch point located in the second sub-display region according to the actual changes in the capacitance values of the touch points located in the first sub-display region and further according to the changes in the capacitance values corresponding to the touch points located in the second display region obtained by the second touch chip.

Optionally, the method further comprises: obtaining actual changes in the capacitance values of the touch points located in the second sub-display region according to the changes in the capacitance values corresponding to the touch points located in the second sub-display region which are obtained by the first touch chip and the second touch chip, respectively; determining a coordinate of a target touch point located in the first sub-display region according to the actual changes in the capacitance values of the touch points located in the second sub-display region and further according to the changes in the capacitance values corresponding to the touch points located in the first display region obtained by the first touch chip.

Optionally, the obtaining actual changes in the capacitance values of the touch points located in the first sub-display region according to the changes in the capacitance values corresponding to the touch points located in the first sub-display region which are obtained by the first touch chip and the second touch chip respectively comprises: upon a condition that difference between the changes in the capacitance values corresponding to the touch points located in the first sub-display region respectively obtained by the first touch chip and the second touch chip is not greater than a preset threshold, using the changes in the capacitance values corresponding to the touch points located in the first sub-display region obtained by the second touch chip as the actual changes in the capacitance values of the touch points located in the first sub-display region.

Optionally, the obtaining actual changes in the capacitance values of the touch points located in the first sub-display region according to the changes in the capacitance values corresponding to the touch points located in the first sub-display region which are obtained by the first touch chip and the second touch chip respectively comprises: upon a condition that difference between the changes in the capacitance values corresponding to the touch points located in the first sub-display region respectively obtained by the first touch chip and the second touch chip is greater than a preset threshold, for each of the touch points located in the first sub-display region, using the average of the changes in the capacitance value corresponding to the touch point located in the first sub-display region respectively obtained by the first touch chip and the second touch chip as the actual change in the capacitance value of the touch point located in the first sub-display region.

Optionally, determining a coordinate of a target touch point located in the second sub-display region according to the actual changes in the capacitance values of the touch points located in the first sub-display region and further according to the changes in the capacitance values corresponding to the touch points located in the second display region obtained by the second touch chip comprises: selecting a first adjacent touch point, which is located in the first sub-display region, and a second adjacent touch point, which is located in the second display region but not in the second sub-display region, for the target touch point located in the second sub-display region; according to an average of the actual change in the capacitance value of the first adjacent touch point, the change in the capacitance value of the target touch point, and the change in the capacitance value of the second adjacent touch point, determining a final change in the capacitance value corresponding to the target touch point; according to the final change in the capacitance value corresponding to the target touch point, determining the coordinate of the target touch point located in the second sub-display region.

Optionally, obtaining actual changes in the capacitance values of the touch points located in the second sub-display region according to the changes in the capacitance values corresponding to the touch points located in the second sub-display region which are obtained by the first touch chip and the second touch chip respectively comprises:

upon a condition that difference between the changes in the capacitance values corresponding to the touch points located in the second sub-display region respectively obtained by the first touch chip and the second touch chip is not greater than a preset threshold, using the changes in the capacitance values corresponding to the touch points located in the second sub-display region obtained by the first touch chip as the actual changes in the capacitance values of the touch points located in the second sub-display region.

Optionally, obtaining actual changes in the capacitance values of the touch points located in the second sub-display region according to the changes in the capacitance values corresponding to the touch points located in the second sub-display region which are obtained by the first touch chip and the second touch chip respectively comprises: upon a condition that difference between the changes in the capacitance values corresponding to the touch points located in the second sub-display region respectively obtained by the first touch chip and the second touch chip is greater than a preset threshold, for each of the touch points in the second sub-display region, using the average of the changes in the capacitance value corresponding to the touch point located in the second sub-display region respectively obtained by the first touch chip and the second touch chip as the actual change in the capacitance value of the touch point located in the second sub-display region.

Optionally, determining a coordinate of a target touch point located in the first sub-display region according to the actual changes in the capacitance values of the touch points located in the second sub-display region and further according to the changes in the capacitance values corresponding to the touch points located in the first display region obtained by the first touch chip comprises: selecting a third adjacent touch point, which is located in the first display region but not in the first sub-display region, and a fourth adjacent touch point, which is located in the second sub-display region, for a target touch point located in the first sub-display region; according to an average of the actual change in the capacitance value of the fourth adjacent touch point, the change in the capacitance value of the target touch point, and the change in the capacitance value of the third adjacent touch point, determining a final change in the capacitance value corresponding to the target touch point; according to the final change in the capacitance value corresponding to the target touch point, determining the coordinate of the target touch point located in the first sub-display region.

In the touch display panel and method for measuring touch points thereof provided by the embodiments of the present disclosure, the touch display panel comprises a first display region and a second display region that are adjacently arranged. In the first display region, there is a first sub-display region adjacent to the second display region. In the second display region, there is a second sub-display region adjacent to the first display region. The first display region and the second sub-display region are both connected to the first touch chip, and the second display region and the first sub-display region are both connected to the second touch chip. Therefore, the coordinate of each of the touch points located in the first sub-display region and the second sub-display region can be measured by the first touch chip and the second touch chip respectively, so that when it is necessary to use the coordinates of the touch points located in the second sub-display region for joint calculation for obtaining the coordinates of the touch points located in the first sub-display region, the data can all be obtained through the first touch chip, and similarly, when it is necessary to use the coordinates of the touch points located in the first sub-display region for joint calculation for obtaining the coordinates of the touch points located in the second sub-display region, the data can all be obtained through the second touch chip, thereby ensuring the unity of data sources. The original data in the two sub-display regions can be corrected by the two touch chips, so that the errors of the data sources are consistent, and the accuracy and linearity of the calculation of the touch coordinates in the middle boundary region of the touch display panel in the prior arts can be improved. In addition, in this way, the coordinates of the touch points located in the first sub-display region and the second sub-display region can be double-measured by the first touch chip and the second touch chip. That avoids great errors of the coordinates of the touch points located in the first sub-display region and the second sub-display region which are induced by greater errors of values obtained by single measurement when the first touch chip or the second touch chip performs the single measurement, thereby enhancing data redundancy and increasing data accuracy.

DETAILED DESCRIPTION

To help a person skilled in the art better understand the solutions of the present disclosure, the following clearly and completely describes the technical solutions in the embodiments of the present invention with reference to the accompanying drawings in the embodiments of the present disclosure. Apparently, the described embodiments are a part rather than all of the embodiments of the present invention. All other embodiments obtained by a person of ordinary skill in the art based on the embodiments of the present disclosure without creative efforts shall fall within the protection scope of the present disclosure.

Figure 4:
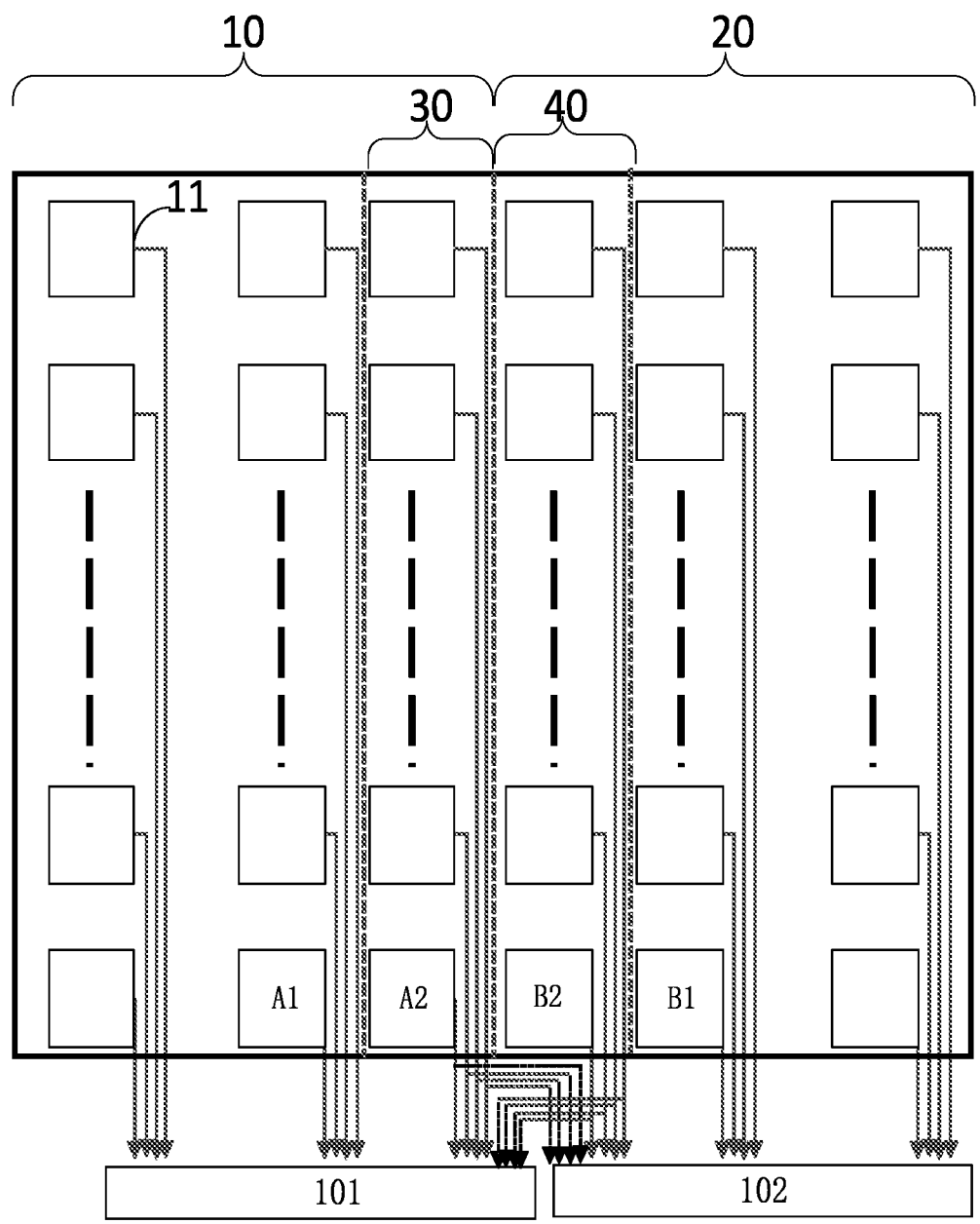
FIG. 4 is a schematic structural diagram of a self-capacitive touch display according to an embodiment of the present disclosure.
Figure 5:
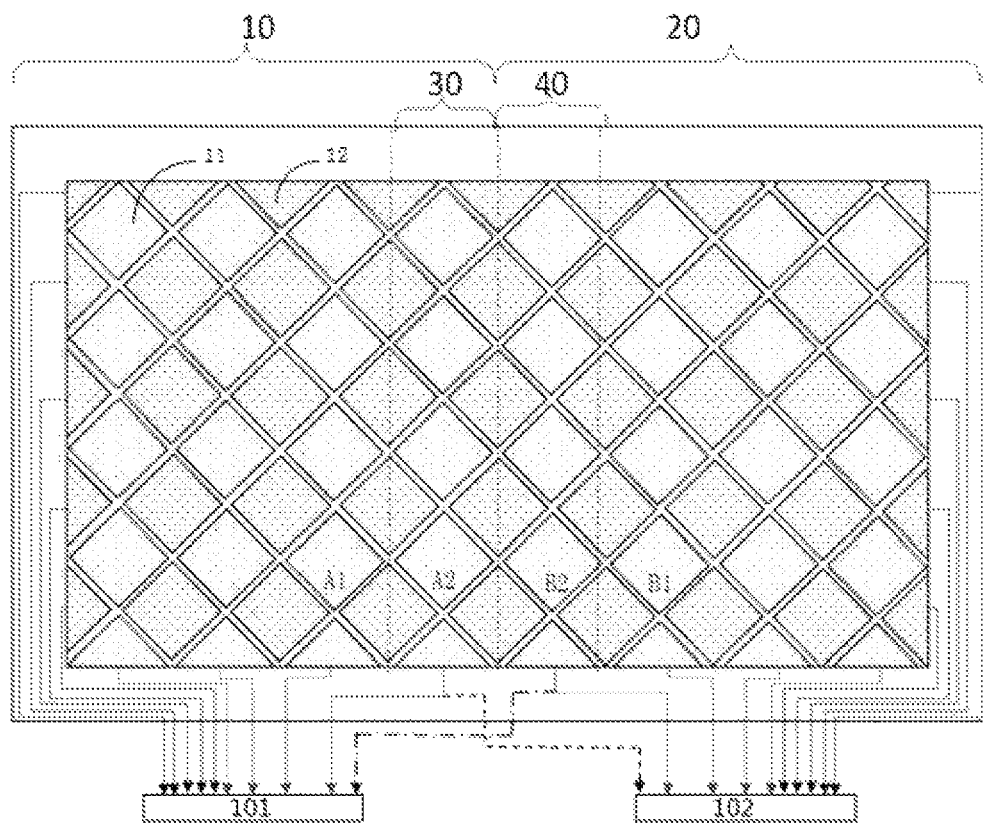
FIG. 5 is a schematic structural diagram of a double-layer mutual-capacitive touch display panel according to an embodiment of the present disclosure.
Figure 6:
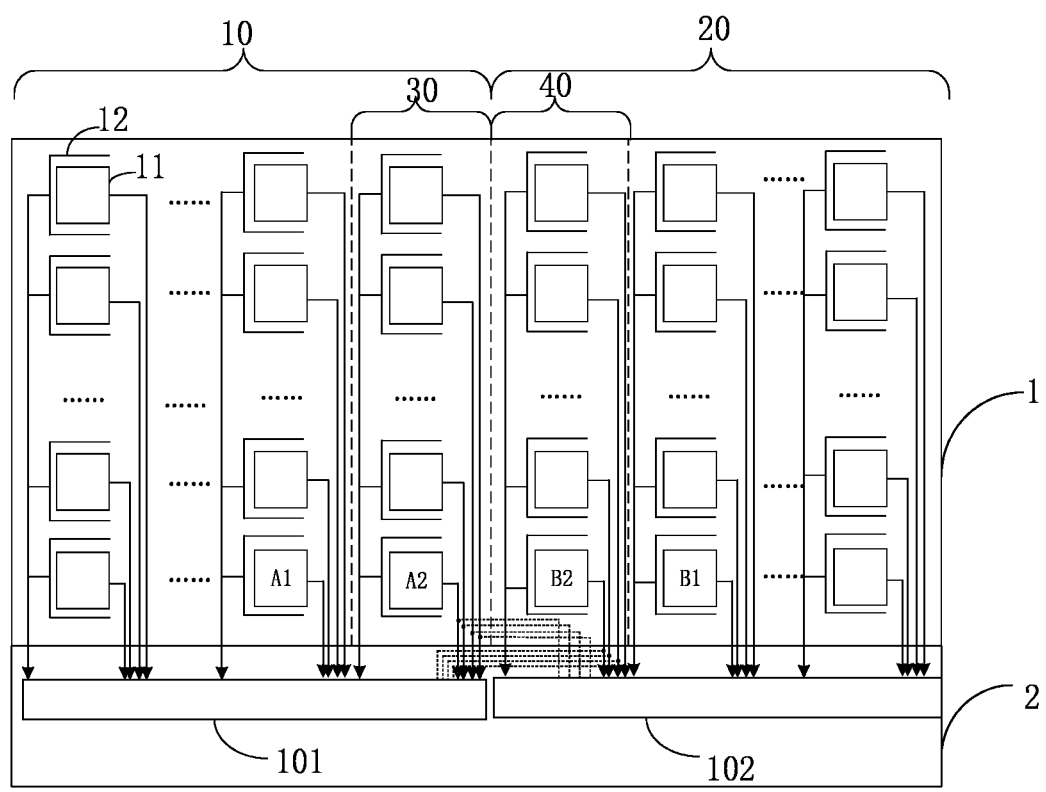
FIG. 6 is a schematic structural diagram of a single-layer mutual-capacitive touch display panel according to an embodiment of the present disclosure.

Please refer to FIG. 4, FIG. 5, and FIG. 6. FIG. 4 illustrates a schematic structural diagram of a self-capacitive touch display according to an embodiment of the present disclosure. FIG. 5 illustrates a schematic structural diagram of a double-layer mutual-capacitive touch display panel according to an embodiment of the present disclosure. FIG. 6 illustrates a schematic structural diagram of a single-layer mutual-capacitive touch display panel according to an embodiment of the present disclosure. As shown in FIG. 4, FIG. 5 or FIG. 6, the touch display panel comprises a first display region 10 and a second display region 20 adjacently arranged, a first touch chip 101 and a second touch chip 102. A first sub-display region 30 located in the first display region 10 is adjacent to a second sub-display region 40 located in the second display region 20.

The first touch chip 101 is connected to a plurality of touch electrodes located in the first display region 10 and the second sub-display region 40 respectively, and the second touch chip 102 is connected to a plurality of touch electrodes located in the second display region 20 and the first sub-display region 30 respectively.

The touch display panel comprises a first display region 10 and a second display region 20 that are adjacently arranged. In the first display region 10, there is a first sub-display region 30 adjacent to the second display region 20. In the second display region 20, there is a second sub-display region 40 adjacent to the first display region 10. Wherein, the first display region 10 and the second sub-display region 40 are both connected to the first touch chip 101, and the second display region 20 and the first sub-display region 30 are both connected to the second touch chip 102. Therefore, the coordinate of each of the touch points located in the first sub-display region 30 and the second sub-display region 40 can be measured by the first touch chip 101 and the second touch chip 102 respectively, so that when it is necessary to use the coordinates of the touch points located in the second sub-display region 40 for joint calculation for obtaining the coordinates of the touch points located in the first sub-display region 30, the data can all be obtained through the first touch chip 101, and similarly, when it is necessary to use the coordinates of the touch points located in the first sub-display region 30 for joint calculation for obtaining the coordinates of the touch points located in the second sub-display region 40, the data can all be obtained through the second touch chip 102, thereby ensuring the unity of data sources, making data errors consistent, and improving the linearity of calculations. In addition, in this way, the coordinates of the touch points located in the first sub-display region 30 and the second sub-display region 40 can be double-measured by the first touch chip 101 and the second touch chip 102. That avoids great errors of the coordinates of the touch points located in the first sub-display region 30 and the second sub-display region 40 which are induced by greater errors of values obtained by single measurement when the first touch chip 101 or the second touch chip 102 performs the single measurement, thereby enhancing data redundancy and increasing data accuracy.

The touch display panel comprises a plurality of touch electrodes arranged in an array, and each touch electrode is connected to the corresponding touch chip through a single signal line, wherein: the touch electrodes located in the first display region 10 but not located in the first sub-display region 30 are connected to the first touch chip 101; the touch electrodes located in the first sub-display region 30 are connected to the first touch chip 101 and the second touch chip 102 respectively; the touch electrodes located in the second display region 20 but not in the second sub-display region 40 are connected to the second touch chip 102; the touch electrodes located in the second sub-display region 40 are connected to the first touch chip 101 and the second touch chip 102 respectively.

The coordinates of the touch points in the touch electrodes located in the first display region 10 but not in the first sub-display region 30 are measured by the first touch chip 101. The coordinates of the touch points in the touch electrodes located in the first sub-display region 30 are measured by the first touch chip 101 and the second touch chip 102 respectively. The coordinates of the touch points located in the touch electrodes in the second sub-display region 40 are also measured by the first touch chip 101 and the second touch chip 102 respectively. The coordinates of the touch points located in the touch electrodes in the second display region 20 but not in the second sub-display region 40 are measured by the second touch chip 102.

In addition to measuring the coordinates of the touch points in the touch electrodes located in the first display region 10, the first touch chip 101 can also measure the coordinates of the touch points in the touch electrodes located in the second sub-display region 40. In addition to measuring the coordinates of the touch points in the touch electrodes located in the second display region 20, the second touch chip 102 can also measure the coordinates of the touch points in the touch electrodes located in the first sub-display region 30.

The touch display panel is a self-capacitive touch display panel, or a mutual-capacitive touch display panel, or can also be a compatible self-capacitive and mutual-capacitive display panel. The self-capacitive touch display panel transmits charges by using a change in a capacitance value of a single electrode. One terminal of the single electrode is coupled to the ground, and the other terminal is connected to an excitation circuit or a sampling circuit to realize identification of the change in the capacitance value. The advantage of the self-capacitive touch display panel is that the amount of calculation is small. The disadvantage thereof is that only single-point touch can be achieved, and ghost points will appear in multi-point touch. The mutual-capacitive touch display panel transmits charges by using two electrodes, one electrode is connected to an excitation circuit, and the other electrode is connected to a sampling circuit to realize the identification of the change in the capacitance value. The advantage of the mutual-capacitive touch display panel is that it has high touch accuracy and can realize multi-touch. The disadvantage thereof is that the calculation is complicated and the power consumption is large.

Figure 1:
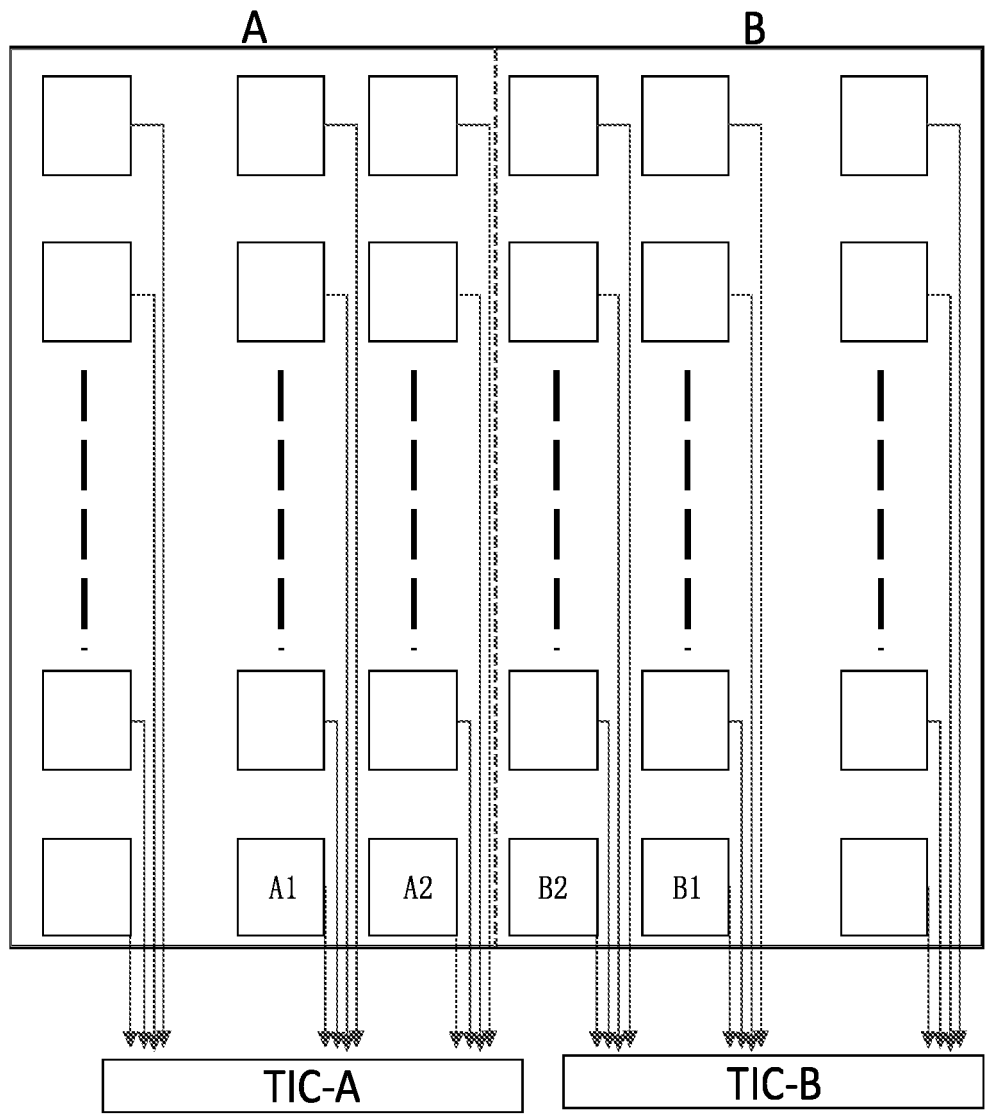
FIG. 1 is a schematic structural diagram of a self-capacitive touch display panel in prior arts.

Corresponding to FIG. 1, FIG. 4 is a schematic structural diagram of a self-capacitive touch display panel provided by an embodiment of the present disclosure. Touch electrodes comprise first touch electrodes 11. The first touch chip 101 is electronically connected to the first touch electrodes located in the first display region 10 and the second sub-display region 40 respectively. The second touch chip 102 is electrically connected to the first touch electrodes 11 located in the second display region 20 and the first sub-display region 30 respectively.

The first touch electrodes 11 and the ground form self-capacitive touch capacitances. When the touch chip outputs a scan signal to the first touch electrodes 11 or a finger touches the first touch electrodes 11, the touch chip determines the touch locations through detecting the changes in the capacitance values of the first touch electrodes 11 relative to the ground, and reports the locations of the points.

The touch electrodes also comprise second touch electrodes 12. Mutual-capacitive touch capacitances are formed between the first touch electrodes 11 and the second touch electrodes 12. Each of the second touch electrodes 12 is connected to at least one of the first touch chip 101 and the second touch chip 102.

FIG. 5 is a schematic structural diagram of a double-layer mutual-capacitive touch display panel provided by an embodiment of the present disclosure. Touch electrodes comprise first touch electrodes 11 and second touch electrodes 12 arranged in different layers. The first touch electrodes 11 and the second touch electrode 12 form mutual-capacitive touch capacitances. The first touch electrodes 11 and the second touch electrodes 12 are arranged in a crossing pattern. Each second touch electrode 12 is electrically connected to the first touch chip 101 and the second touch chip 102. In the cases where the second touch electrodes 12 are disposed above the first touch electrodes 11, when a scan signal is output to the second touch electrodes 12 through the touch chip or a finger touches the second touch electrodes 12, the touch locations are determined according to the changes in the capacitance values between the first touch electrodes 11 and the second touch electrodes 12, and the locations of the points are reported.

Figure 3:
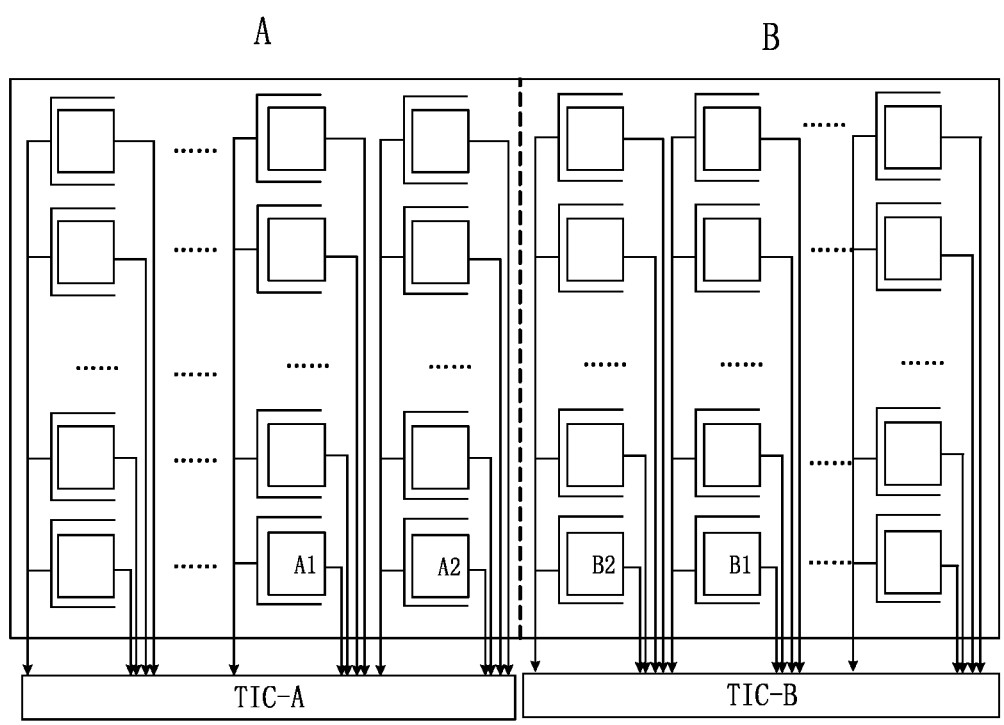
FIG. 3 is a schematic structural diagram of a single-layer mutual-capacitive touch display panel in prior arts.

Corresponding to FIG. 3, FIG. 6 is a schematic structural diagram of a single-layer mutual-capacitive touch display panel provided by an embodiment of the present disclosure. Touch electrodes comprise first touch electrodes 11 and second touch electrodes 12 (the L-shaped electrodes surrounding the first touch electrode 11) which are arranged in the same layer. The first touch electrodes 11 and the second touch electrodes 12 form mutual-capacitive touch capacitances. Wherein, the first touch chip 101 is also connected to the second touch electrodes 12 located in the first display region 10, and the second touch chip 102 is also connected to the second touch electrodes 12 located in the second display region 20. If the first touch electrodes 11 are receiving electrodes and the second touch electrodes 12 are transmitting electrodes, then in each column of electrodes, one second touch electrode 12 is used as a transmitting electrode and the first touch electrodes 11 are receiving electrodes. When a scan signal is output to the second touch electrodes 12 through the touch chip or a finger touches the second touch electrodes 12, the touch locations are determined according to the changes in the capacitance values between the first touch electrodes 11 and the second touch electrodes 12, and the locations of the points are reported.

When the first touch electrodes 11 and the second touch electrodes 12 are arranged in the same layer, an insulating region (not shown in the figure) is arranged between the first touch electrodes 11 and the second touch electrodes 12. When the first touch electrodes 11 and the second touch electrodes 12 are arranged in different layers, an insulating layer (not shown in the figure) is arranged between the first touch electrodes 11 and the second touch electrodes 12.

Regardless of whether the first touch electrodes 11 and the second touch electrodes 12 are arranged in the same layer or in different layers, the distribution positions between the first touch electrodes 11 and the second touch electrodes 12 should be set correspondingly, that is, the distribution positions between the first touch electrodes 11 and the second touch electrodes 12 should be set such that mutual-capacitive touch capacitances are formed between the first touch electrodes 11 and the second touch electrodes 12.

In some embodiments, for example, in an application where the touch display panel is a folding screen, the first sub-display region 30 and the second sub-display region 40 are flexible display regions, and the touch electrodes located in the first sub-display region 30 and the second sub-display region 40 are flexible.

Figure 7:
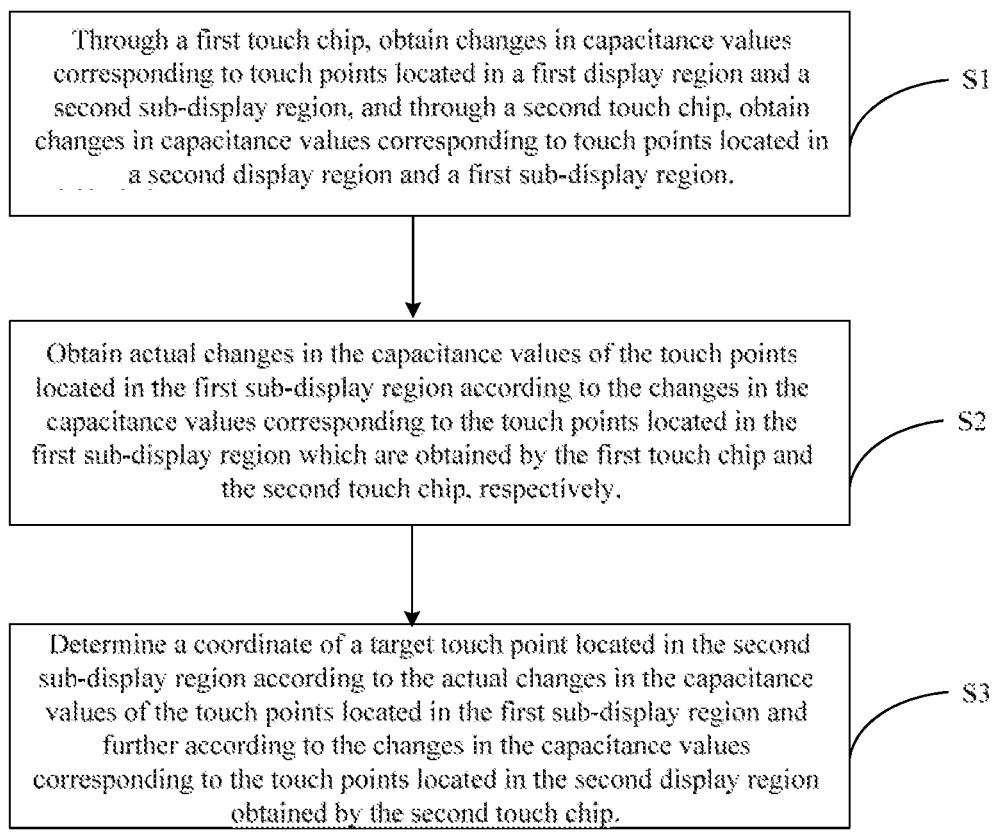
FIG. 7 is a schematic flowchart of a method for measuring touch points of a touch display panel according to an embodiment of the present disclosure.

Moreover, FIG. 7 is a schematic flowchart of a method for measuring touch points of a touch display panel provided by an embodiment of the present disclosure. The method for measuring touch points comprises the following steps:

S1: through the first touch chip 101, obtaining the changes in the capacitance values corresponding to the touch points located in the first display region 10 and the second sub-display region 40, and through the second touch chip 102, obtaining the changes in the capacitance values corresponding to the touch points located in the second display region 20 and the first sub-display region 30.

The first touch chip 101 obtains not only the changes in the capacitance values corresponding to the touch points located in the first display region 10, but also the changes in the capacitance values corresponding to the touch points located in the second sub-display region 40. At the same time, the second touch chip 102 obtains not only the changes in the capacitance values corresponding to the touch points located in the second display region 20, but also the changes in the capacitance values corresponding to the touch points located in the first sub-display region 30.

S2: according to the changes in the capacitance values corresponding to the touch points located in the first sub-display region 30 which are obtained by the first touch chip 101 and the second touch chip 102 respectively, obtaining the actual changes in the capacitance values of the touch points located in the first sub-display region 30.

When the coordinate of a target touch point in the second sub-display region 40 is to be obtained, in order to increase the accuracy of the measured coordinate of the target touch point, the changes in the capacitance values corresponding to at least two touch points adjacent to the target touch point and the target touch point need to be used together to calculate the coordinate of the target touch point. One of the two adjacent touch points is selected as a touch point located in the first sub-display region 30, and the other is selected as a point located in the second display region 20 but not in the second sub-display region 40.

Since both of the first touch chip 101 and the second touch chip 102 can measure the changes in the capacitance values corresponding to the touch points located in the first sub-display region 30 respectively, through comparing the changes in the capacitance values corresponding to the touch points located in the first sub-display region 30 which are measured by the first touch chip 101 and the second touch chip 102 respectively, the actual changes in the touch points located in the first sub-display region 30 can be obtained finally.

S3: according to the actual changes in the capacitance values of the touch points located in the first sub-display region 30 and further according to the changes in the capacitance values corresponding to the touch points located in the second display region 20 obtained by the second touch chip 102, determining the coordinate of the target touch point in the second sub-display region 40.

Figure 2:
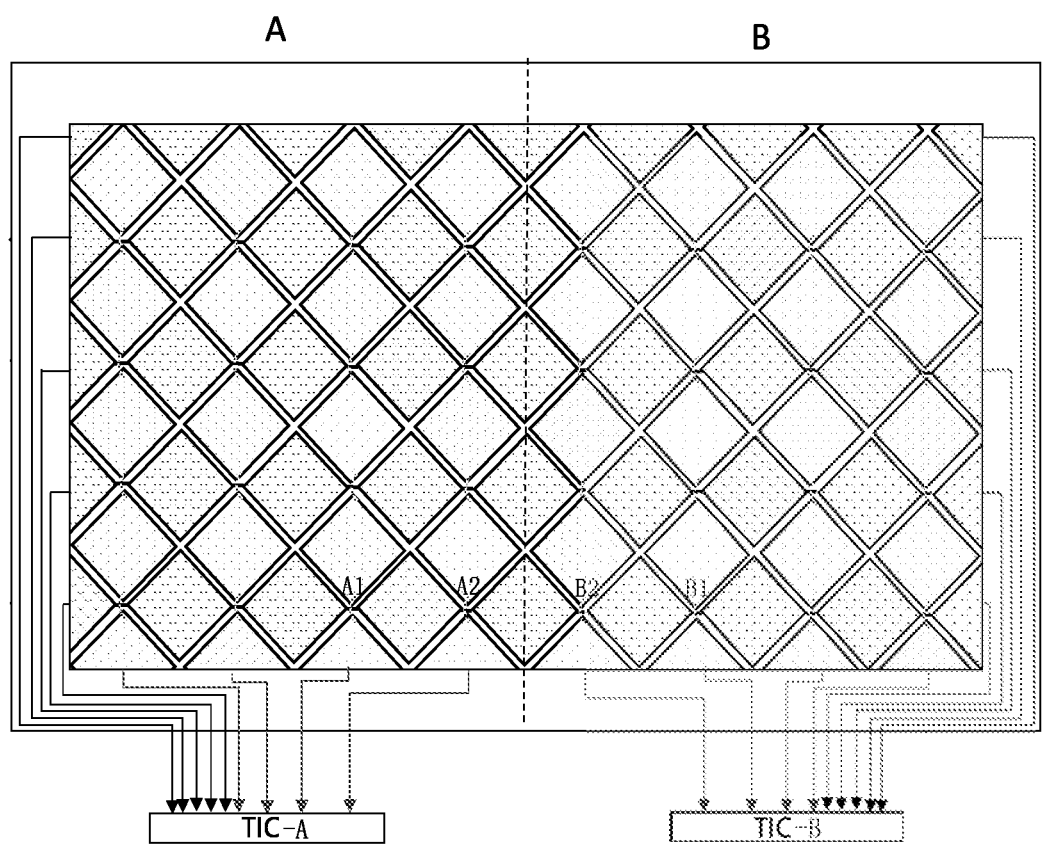
FIG. 2 is a schematic structural diagram of a double-layer mutual-capacitive touch display panel in prior arts.

Specifically, if it is required to determine the coordinate of the target touch point located in the second sub-display region 40, one adjacent touch point is selected in the first sub-display region 30, and the other adjacent touch point is selected in the second display region 20 but not in the second sub-display region 40, wherein the changes in the capacitance values corresponding to the other adjacent touch point and the target touch point are both measured by the second touch chip 102. Then, the changes in the capacitance values corresponding to the two adjacent touch points and the target touch point are used together to calculate the coordinate of the target touch point. For example, as shown in FIG. 2, when it is required to calculate the coordinate of B2, A2 and B1 are involved, wherein, B1 and B2 are obtained by the second touch chip 102, and A2 are obtained by the first touch chip 101 and the second touch chip 102 respectively.

The change in the capacitance value corresponding to the target touch point located in the first sub-display region 30 can be measured by the first touch chip 101 and the second touch chip 102 respectively. However, generally, for the change in the capacitance value corresponding to the target touch point located in the first sub-display region 30, the measurement performed by the first touch chip 101 is more accurate than the measurement performed by the second touch chip 102. Thus, generally, the change in the capacitance value corresponding to the target touch point is directly measured by the first touch chip 101, and in this way, both the change in the capacitance value corresponding to the target touch point and the change in the capacitance value corresponding to its adjacent point located in the first display region 10 are measured by the first touch chip 101, which improves the consistency of data errors.

In order to determine the coordinate of the target touch point located in the first sub-display region 30, S2 further comprises: according to the changes in the capacitance values corresponding to the touch points located in the second sub-display region 40 respectively obtained according to the first touch chip 101 and the second touch chip 102, obtaining the actual changes in the capacitance values of the touch points located in the second sub-display region 40; S3 further comprises: according to the actual changes in the capacitance values of the touch points located in the second sub-display region 40 and further according to the changes in the capacitance values corresponding to the touch points located in the first display region 10 obtained by the first touch chip 101, determining the coordinate of the target touch point located in the first sub-display region 30. For example, in FIG. 2, when it is required to calculate the coordinate of A2, A1 and B2 are involved, wherein, A1 and A2 are obtained by the first touch chip 101, and B2 is obtained by the first touch chip 101 and the second touch chip 102 respectively.

In the method for measuring touch points of a touch display panel provided by an embodiment of the present disclosure, firstly, the first touch chip 101 obtains the changes in the capacitance values corresponding to the touch points located in the first display region 10 and the second sub-display region 40, and simultaneously, the second touch chip 102 obtains the changes in the capacitance values corresponding to the touch points located in the second display region 20 and the first sub-display region. Then, according to the changes in the capacitance values corresponding to the touch points located in the first display region 10 obtained by the first touch chip 101 and the changes in the capacitance values corresponding to the touch points located in the first sub-display region 30 respectively obtained by the first touch chip 101 and the second touch chip 102, the first touch chip 101 obtains a change in a capacitance value corresponding to one adjacent touch point, which is located in the first display region 10, of the target touch point located in the first sub-display region 30; and according to changes in a capacitance value of another adjacent touch point, which is located in the second sub-display region 40, respectively obtained by the first touch chip 101 and the second touch chip 102, the coordinate of the target touch point located in the first sub-display region 30 is obtained. Similarly, according to the changes in the capacitance values corresponding to the touch points located in the region display region 20 obtained by the second touch chip 102 and the changes in the capacitance values corresponding to the touch points located in the first sub-display region 30 respectively obtained by the first touch chip 101 and the second touch chip 102, the second touch chip 102 obtains a change in a capacitance value corresponding to one adjacent touch point, which is located in the second display region 20, of the target touch point located in the second sub-display region 40; and according to changes in a capacitance value of another adjacent touch point, which is located in the first sub-display region 30, respectively obtained by the first touch chip 101 and the second touch chip 102, the coordinate of the target touch point located in the second sub-display region 40 is obtained.

Therefore, the coordinate of each of the touch points located in the first sub-display region 30 and the second sub-display region 40 can be measured by the first touch chip 101 and the second touch chip 102 respectively, so that when it is necessary to use the coordinates of the touch points located in the second sub-display region 40 for joint calculation for obtaining the coordinates of the touch points located in the first sub-display region 30, the data can all be obtained through the first touch chip 101, and similarly, when it is necessary to use the coordinates of the touch points located in the first sub-display region 30 for joint calculation for obtaining the coordinates of the touch points located in the second sub-display region 40, the data can all be obtained through the second touch chip 102, thereby ensuring the unity of data sources. The original data in the two sub-display regions can be corrected by the two touch chips, so that the errors of the data sources are consistent, and the accuracy and linearity of the calculation of the touch coordinates in the middle boundary region of the touch display panel in the prior arts can be improved. In addition, in this way, the coordinates of the touch points located in the first sub-display region 30 and the second sub-display region 40 can be double-measured by the first touch chip 101 and the second touch chip 102. That avoids great errors of the coordinates of the touch points located in the first sub-display region 30 and the second sub-display region 40 which are induced by greater errors of values obtained by single measurement when the first touch chip 101 or the second touch chip 102 performs the single measurement, thereby enhancing data redundancy and increasing data accuracy.

Step S2 comprises the following steps:

S21: if the difference between the changes in the capacitance values corresponding to the touch points located in the first sub-display region 30 respectively obtained by the first touch chip 101 and the second touch chip 102 is not greater than a preset threshold, then using the changes in the capacitance values corresponding to the touch points located in the first sub-display region 30 obtained by the second touch chip 102 as the actual changes in the capacitance values of the touch points located in the first sub-display region 30.

S22: if the difference between the changes in the capacitance values corresponding to the touch points located in the first sub-display region 30 respectively obtained by the first touch chip 101 and the second touch chip 102 is greater than the preset threshold, then, for each of the touch points located in the first sub-display region 30, using the average of the changes in the capacitance value corresponding to the touch point located in the first sub-display region 30 respectively obtained by the first touch chip 101 and the second touch chip 102 as the actual change in the capacitance value of the touch point located in the first sub-display region 30.

Step S3 comprises the following steps:

S31: selecting a first adjacent touch point, which is located in the first sub-display region 30, and a second adjacent touch point, which is located in the second display region 20 but not in the second sub-display region 40, for a target touch point located in the second sub-display region 40;

S32: according to the average of the actual change in the capacitance value of the first adjacent touch point, the change in the capacitance value of the target touch point, and the change in the capacitance value of the second adjacent touch point, determining a final change in the capacitance value corresponding to the target touch point;

S33: according to the final change in the capacitance value corresponding to the target touch point, determining the coordinate of the target touch point located in the second sub-display region 40.

For example, when B2 is used as a target touch point, A2 and B1 are used as the two adjacent touch points of B2, that is, A2 is the first adjacent touch point, B1 is the second adjacent touch point. According to the changes in the capacitance values corresponding to A2, B2 and B1 respectively, the coordinate of B2 is calculated.

Specifically, the second touch chip 102 can measure the changes $\Delta A2'$, $\Delta B2'$, and $\Delta B1'$ in the capacitance values corresponding to A2, B2, and B1, and the first touch chip 101 can measure the changes $\Delta A2$ and $\Delta B2$ in the capacitance values corresponding to A2 and B2. Generally, the change $\Delta B2'$ in the capacitance value corresponding to B2 measured by the second touch chip 102 is more accurate than the change $\Delta B2$ in the capacitance value corresponding to B2 measured by the first touch chip 101, so the second touch chip 102 is directly selected to measure the change ΔB2' in the capacitance value corresponding to B2 measured by the chip 102. In this way, both ΔB2' and ΔB1' are measured by the second touch chip 102, which improves the consistency of data errors. Regarding the change ΔA2 in the capacitance value corresponding to A2 measured by the first touch chip 101 and the change ΔA2' in the capacitance value corresponding to A2 measured by the second touch chip 102, it may be desired to use ΔA2' measured by the second touch chip 102 for calculating the coordinate of B2, thereby enhancing the consistency of data errors. However, ΔA2 measured by the first touch chip 101 is generally more accurate than ΔA2' measured by the second touch chip 102. Thus, comparison between ΔA2 and ΔA2' is required. If the difference between ΔA2 and ΔA2' is not greater than a preset threshold, the comparison result indicates that there is not much difference between ΔA2 and ΔA2', and ΔA2' measured by the second touch chip 102 is directly used as the actual change in the capacitance value corresponding to A2, that is, the coordinate of B2 is calculated according to ΔA2', ΔB2', and ΔB1'. If the difference between ΔA2 and ΔA2' is greater than the preset threshold, the comparison result indicates that there is a large difference between ΔA2 and ΔA2', and then the average of ΔA2 and ΔA2' is taken as the actual change in the capacitance value corresponding to A2. Accordingly, ΔA2' can be corrected according to ΔA2. At this time, the average of (ΔA2+ΔA2')/2, ΔB2', and ΔB1' is used as the final change in the capacitance value corresponding to B2, and then the coordinate of B2 is calculated according to the final change in the capacitance value.

Step S2 further comprises the following steps:

S21': if the difference between the changes in the capacitance values corresponding to the touch points located in the second sub-display region 40 respectively obtained by the first touch chip 101 and the second touch chip 102 is not greater than a preset threshold, then using the changes in the capacitance values corresponding to the touch points located in the second sub-display region 40 obtained by the first touch chip 101 as the actual changes in the capacitance values of the touch points located in the second sub-display region 40.

S22': if the difference between the changes in the capacitance values corresponding to the touch points located in the second sub-display region 40 respectively obtained by the first touch chip 101 and the second touch chip 102 is greater than the preset threshold, then, for each of the touch points located in the second sub-display region 40, using the average of the changes in the capacitance value corresponding to the touch point located in the second sub-display region 40 respectively obtained by the first touch chip 101 and the second touch chip 102 as the actual change in the capacitance value of the touch point located in the second sub-display region 40.

Based on the above embodiment, Step S3 further comprises the following steps:

S31': selecting a third adjacent touch point, which is located in the first display region 10 but not in the first sub-display region 30, and a fourth adjacent touch point, which is located in the second sub-display region 40, for a target touch point located in the first sub-display region 30;

S32': according to the average of the actual change in the capacitance value of the fourth adjacent touch point, the change in the capacitance value of the target touch point, and the change in the capacitance value of the third adjacent touch point, determining a final change in the capacitance value corresponding to the target touch point;

S33': according to the final change in the capacitance value corresponding to the target touch point, determining the coordinate of the target touch point located in the first sub-display region 30.

For example, when A2 is used as a target touch point, A1 and B2 are used as the two adjacent touch points of B2, that is, A1 is the third adjacent touch point, B2 is the fourth adjacent touch point. According to the changes in the capacitance values corresponding to A1, A2 and B2 respectively, the coordinate of A2 is calculated.

Specifically, the first touch chip 101 can measure the changes ΔA1, ΔA2, and ΔB2 in the capacitance values corresponding to A1, A2, and B2, and the second touch chip 102 can measure the changes ΔA2' and ΔB2' in the capacitance values corresponding to A2 and B2. Generally, the change ΔA2 in the capacitance value corresponding to A2 measured by the first touch chip 101 is more accurate than the change ΔA2' in the capacitance value corresponding to A2 measured by the second touch chip 102, so the first touch chip 101 is directly selected to measure the change ΔA2 in the capacitance value corresponding to A2 measured by the chip 102. In this way, both ΔA1 and ΔA2 are measured by the first touch chip 101, which improves the consistency of data errors. Regarding the change ΔB2 in the capacitance value corresponding to B2 measured by the first touch chip 101 and the change ΔB2' in the capacitance value corresponding to B2 measured by the second touch chip 102, it may be desired to use ΔB2 measured by the first touch chip 101 for calculating the coordinate of A2, thereby enhancing the consistency of data errors. However, ΔB2' measured by the second touch chip 102 is generally more accurate than ΔB2 measured by the first touch chip 101. Thus, comparison between ΔB2 and ΔB2' is required. If the difference between ΔB2 and ΔB2' is not greater than a preset threshold, the comparison result indicates that there is not much difference between ΔB2 and ΔB2', and ΔB2 measured by the first touch chip 101 is directly used as the actual change in the capacitance value corresponding to B2, that is, the coordinate of A2 is calculated according to ΔA1, ΔA2, and ΔB2. If the difference between ΔB2 and ΔB2' is greater than the preset threshold, the comparison result indicates that there is a large difference between ΔB2 and ΔB2', and then the average of ΔB2 and ΔB2' is taken as the actual change in the capacitance value corresponding to B2. Accordingly, ΔB2 can be corrected according to ΔB2'. The average of ΔA1, ΔA2, and (ΔB2+ΔB2')/2 is used as the final change in the capacitance value corresponding to A2, and then the coordinate of A2 is calculated according to the final change in the capacitance value.

In the touch display panel and method for measuring touch points thereof provided by the embodiments of the present disclosure, the touch display panel comprises a first display region and a second display region that are adjacently arranged. In the first display region, there is a first sub-display region adjacent to the second display region. In the second display region, there is a second sub-display region adjacent to the first display region. The first display region and the second sub-display region are both connected to the first touch chip, and the second display region and the first sub-display region are both connected to the second touch chip. Therefore, the coordinate of each of the touch points located in the first sub-display region and the second sub-display region can be measured by the first touch chip and the second touch chip respectively, so that when it is necessary to use the coordinates of the touch points located in the second sub-display region for joint calculation for obtaining the coordinates of the touch points located in the first sub-display region, the data can all be obtained through the first touch chip, and similarly, when it is necessary to use the coordinates of the touch points located in the first sub-display region for joint calculation for obtaining the coordinates of the touch points located in the second sub-display region, the data can all be obtained through the second touch chip, thereby ensuring the unity of data sources. The original data in the two sub-display regions can be corrected by the two touch chips, so that the errors of the data sources are consistent, and the accuracy and linearity of the calculation of the touch coordinates in the middle boundary region of the touch display panel in the prior arts can be improved. In addition, in this way, the coordinates of the touch points located in the first sub-display region and the second sub-display region can be double-measured by the first touch chip and the second touch chip. That avoids great errors of the coordinates of the touch points located in the first sub-display region and the second sub-display region which are induced by greater errors of values obtained by single measurement when the first touch chip or the second touch chip performs the single measurement, thereby enhancing data redundancy and increasing data accuracy.

Specific examples are used in the disclosure to describe the principle and implementation of the application. The description of the above embodiments is only provided for understanding the application. At the same time, for those skilled in the art, according to the idea of the application, there will be changes in the specific implementation and the scope of application. In summary, the content of this disclosure should not be construed as a limitation to the application.

What is claimed is:

1. A touch display panel comprising:
   a first display region and a second display region adjacently arranged, a first sub-display region located in the first display region being adjacent to a second sub-display region located in the second display region;
   a plurality of first touch electrode blocks separately disposed in a first layer and arranged in an array of multiple rows and multiple columns in the first display region and the second display region, each of the first touch electrode blocks corresponding to a touch point; and
   at least two touch chips comprising a first touch chip and a second touch chip, the first touch chip being connected to the first touch electrode blocks located in the first display region and the second sub-display region respectively, the second touch chip being connected to the first touch electrode blocks located in the second display region and the first sub-display region respectively, wherein coordinates of touch points located in the first sub-display region and the second sub-display region are measured by the first touch chip and the second touch chip, respectively;
   wherein the first touch chip is configured to obtain first changes in capacitance values of touch points located in the first display region and the second sub-display region, and the second touch chip is configured to obtain second changes in capacitance values of touch points located in the second display region and the first sub-display region;
   the second touch chip is configured to determine actual changes in the capacitance values of the touch points located in the first sub-display region according to a comparison between the first changes in the capacitance values of the touch points located in the first sub-display region obtained by the first touch chip and the second changes in the capacitance values of the touch points located in the first sub-display region obtained by the second touch chip, respectively;
   the second touch chip is configured to determine a coordinate of a first target touch point located in the second sub-display region according to the actual changes in the capacitance values of the touch points located in the first sub-display region determined by the second touch chip, and further according to the changes in the capacitance values of the touch points located in the second display region obtained by the second touch chip; and
   for each respective touch point of the touch points located in the first sub-display region, in response to determining that a difference between a first change in a capacitance value of the respective touch point located in the first sub-display region obtained by the first touch chip and a second change in a capacitance value of the respective touch point located in the first sub-display region obtained by the second touch chip is greater than a preset threshold, the second touch chip is configured to use an average of the first change in the capacitance value of the respective touch point located in the first sub-display region obtained by the first touch chip and the second change in the capacitance value of the respective touch point located in the first sub-display region obtained by the second touch chip as an actual change in the capacitance value of the respective touch point located in the first sub-display region to determine the coordinate of the first target touch point located in the second sub-display region.

2. The touch display panel of claim 1, wherein the touch display panel is a self-capacitive touch display panel, self-capacitive touch capacitances are formed between the first touch electrode blocks and a ground.

3. The touch display panel of claim 1, wherein the touch display panel is a mutual-capacitive touch display panel further comprising a plurality of second touch electrodes, mutual-capacitive touch capacitances are formed between the first touch electrode blocks and the second touch electrodes, and each of the second touch electrodes is coupled to at least one of the first touch chip and the second touch chip.

4. The touch display panel of claim 3, wherein the touch display panel is a double-layer mutual-capacitive touch display panel, the plurality of second touch electrodes comprise a plurality of second touch electrode blocks separately disposed in a second layer, the first touch electrode blocks and the second touch electrode blocks are arranged in different layers, the first touch electrode blocks and the second touch electrode blocks are arranged in a crossing pattern, and each of the second touch electrode blocks is electrically connected to the first touch chip and the second touch chip.

5. The touch display panel of claim 3, wherein the touch display panel is a single-layer mutual-capacitive touch display panel, the plurality of second touch electrodes comprise a plurality of L-shaped or U-shaped electrodes respectively surrounding a corresponding one of the first touch electrode blocks, the first touch electrode blocks and the second touch electrodes are arranged in the same layer, the first touch chip is further connected to the second touch electrodes located in the first display region, the second touch chip is further connected to the second touch electrodes in the second display region.

6. The touch display panel of claim 1, wherein the first sub-display region and the second sub-display region are flexible display regions, and the first touch electrode blocks located in the first sub-display region and the second sub-display region are flexible.

7. The device of claim 1, wherein for each respective touch point of the touch points located in the first sub-display region, in response to determining that the difference between the first change in the capacitance value of the respective touch point located in the first sub-display region obtained by the first touch chip and the second change in the capacitance value of the respective touch point located in the first sub-display region obtained by the second touch chip is not greater than the preset threshold, the second touch chip is configured to use the second change in the capacitance value of the respective touch point located in the first sub-display region obtained by the second touch chip as the actual change in the capacitance value of the respective touch point located in the first sub-display region to determine the coordinate of the first target touch point located in the second sub-display region.

8. The device of claim 1, wherein for each respective touch point of the touch points located in the first sub-display region, the second touch chip is further configured to:
determine the difference between the first change in the capacitance value of the respective touch point located in the first sub-display region obtained by the first touch chip and the second change in the capacitance value of the respective touch point located in the first sub-display region obtained by the second touch chip; and
compare the difference with the preset threshold to determine whether the difference is greater than the preset threshold for the respective touch point located in the first sub-display region.

9. The device of 1, wherein to determine the coordinate of the first target touch point located in the second sub-display region, the second touch chip is configured to:
select a first adjacent touch point, which is located in the first sub-display region, and a second adjacent touch point, which is located in the second display region but not in the second sub-display region, for the first target touch point located in the second sub-display region;
determine a final change in a capacitance value of the first target touch point located in the second sub-display region according to an average of one of the actual changes in the capacitance values of the touch points located in the first sub-display region corresponding to the first adjacent touch point, one of the changes in the capacitance values of the touch points located in the second display region corresponding to the target touch point located in the second sub-display region, and one of the changes in the capacitance values of the touch points located in the second display region corresponding to the second adjacent touch point; and
determine the coordinate of the first target touch point located in the second sub-display region according to the final change in the capacitance value of the target touch point located in the second sub-display region.

10. A method for measuring touch points, applied to a touch display panel, the touch display panel comprising:
a first display region and a second display region adjacently arranged, a first sub-display region located in the first display region being adjacent to a second sub-display region located in the second display region;
a plurality of first touch electrode blocks separately disposed in a first layer and arranged in an array of multiple rows and multiple columns in the first display region and the second display region, each of the first touch electrode blocks corresponding to a touch point; and
at least two touch chips comprising a first touch chip and a second touch chip, the first touch chip being connected to the first touch electrode blocks located in the first display region and the second sub-display region respectively, the second touch chip being connected to the first touch electrode blocks located in the second display region and the first sub-display region respectively, wherein coordinates of touch points located in the first sub-display region and the second sub-display region are measured by the first touch chip and the second touch chip, respectively;
the method comprising:
through the first touch chip, obtaining first changes in capacitance values of touch points located in the first display region and the second sub-display region, and through the second touch chip, obtaining second changes in capacitance values of touch points located in the second display region and the first sub-display region;
determining, by the second touch chip, actual changes in the capacitance values of the touch points located in the first sub-display region according to a comparison between the first changes in the capacitance values of the touch points located in the first sub-display region obtained by the first touch chip and the second changes in the capacitance values of the touch points located in the first sub-display region obtained by the second touch chip, respectively; and
determining, by the second touch chip, a coordinate of a first target touch point located in the second sub-display region according to the actual changes in the capacitance values of the touch points located in the first sub-display region determined by the second touch chip, and further according to the changes in the capacitance values of the touch points located in the second display region obtained by the second touch chip,
wherein the determining of the actual changes in the capacitance values of the touch points located in the first sub-display region by the second touch chip comprises:
for each respective touch point of the touch points located in the first sub-display region, in response to determining that a difference between a first change in a capacitance value of the respective touch point located in the first sub-display region obtained by the first touch chip and a second change in a capacitance value of the respective touch point located in the first sub-display region obtained by the second touch chip is greater than a preset threshold, using an average of the first change in the capacitance value of the respective touch point located in the first sub-display region obtained by the first touch chip and the second change in the capacitance value of the respective touch point located in the first sub-display region as an actual change in the capacitance value of the respective touch point located in the first sub-display region to determine the coordinate of the first target touch point located in the second sub-display region by the second touch chip.

11. The method of claim 10, further comprising:
  determining, by the first touch chip, actual changes in the capacitance values of the touch points located in the second sub-display region according to a comparison between the first changes in the capacitance values of the touch points located in the second sub-display region obtained by the first touch chip and the second changes in the capacitance values of the touch points located in the second sub-display region obtained by the second touch chip, respectively; and
  determining, by the first touch chip, a coordinate of a second target touch point located in the first sub-display region according to the actual changes in the capacitance values of the touch points located in the second sub-display region determined by the first touch chip, and further according to the changes in the capacitance values of the touch points located in the first display region obtained by the first touch chip.

12. The method of claim 11, wherein the determining of the actual changes in the capacitance values of the touch points located in the second sub-display region by the first touch chip comprises:
  for each respective touch point of the touch points located in the second sub-display region, in response to determining that a difference between a first change in a capacitance value of the respective touch point located in the second sub-display region respectively obtained by the first touch chip and a second change in a capacitance value of the respective touch point located in the second sub-display region obtained by the second touch chip is not greater than the preset threshold, using the first change in the capacitance value of the respective touch point located in the second sub-display region obtained by the first touch chip as an actual change in the capacitance value of the respective touch point located in the second sub-display region to determine the coordinate of the second target touch point located in the first sub-display region by the first touch chip.

13. The method of claim 11, wherein the determining of the actual changes in the capacitance values of the touch points located in the second sub-display region by the first touch chip comprises:
  for each respective touch point of the touch points located in the second sub-display region, in response to determining that a difference between a first change in a capacitance value of the respective touch point located in the second sub-display region obtained by the first touch chip and a second change in a capacitance value of the respective touch point located in the second sub-display region obtained by the second touch chip is greater than the preset threshold, using an average of the first change in the capacitance value of the respective touch point located in the second sub-display region obtained by the first touch chip and the second change in the capacitance value of the respective touch point located in the second sub-display region obtained by the second touch chip as an actual change in the capacitance value of the respective touch point located in the second sub-display region to determine the coordinate of the second target touch point located in the first sub-display region by the first touch chip.

14. The method of claim 11, wherein the determining, by the first touch chip, of the coordinate of the second target touch point located in the first sub-display region comprises:
  selecting a third adjacent touch point, which is located in the first display region but not in the first sub-display region, and a fourth adjacent touch point, which is located in the second sub-display region, for the second target touch point located in the first sub-display region;
  determining a final change in a capacitance value of the second target touch point located in the first sub-display region according to an average of one of the actual changes in the capacitance values of the touch points located in the second sub-display region corresponding to the fourth adjacent touch point, one of the changes in the capacitance values of the touch points located in the first display region corresponding to the target touch point located in the first sub-display region, and one of the changes in the capacitance values of the touch points located in the first display region corresponding to the third adjacent touch point; and
  determining the coordinate of the second target touch point located in the first sub-display region according to the final change in the capacitance value of the target touch point located in the first sub-display region.

15. The method of claim 10, wherein the determining of the actual changes in the capacitance values of the touch points located in the first sub-display region by the second touch chip further comprises:
  for each respective touch point of the touch points located in the first sub-display region, in response to determining that the difference between the first change in the capacitance value of the respective touch point located in the first sub-display region obtained by the first touch chip and the second change in the capacitance value of the respective touch point located in the first sub-display region obtained by the second touch chip is not greater than the preset threshold, using the second change in the capacitance value of the respective touch point located in the first sub-display region obtained by the second touch chip as the actual change in the capacitance value of the respective touch point located in the first sub-display region to determine the coordinate of the first target touch point located in the second sub-display region by the second touch chip.

16. The method of claim 10, wherein the determining, by the second touch chip, of the coordinate of the first target touch point located in the second sub-display region comprises:
  selecting a first adjacent touch point, which is located in the first sub-display region, and a second adjacent touch point, which is located in the second display region but not in the second sub-display region, for the first target touch point located in the second sub-display region;
  determining a final change in a capacitance value of the first target touch point located in the second sub-display region according to an average of one of the actual changes in the capacitance values of the touch points located in the first sub-display region corresponding to the first adjacent touch point, one of the changes in the capacitance values of the touch points located in the second display region corresponding to the target touch point located in the second sub-display region, and one of the changes in the capacitance values of the touch points located in the second display region corresponding to the second adjacent touch point; and
  determining the coordinate of the first target touch point located in the second sub-display region according to the final change in the capacitance value of the target touch point located in the second sub-display region.

17. The method of claim 10, further comprising, for each respective touch point of the touch points located in the first sub-display region:
- determining, by the second touch chip, the difference between the first change in the capacitance value of the respective touch point located in the first sub-display region obtained by the first touch chip and the second change in the capacitance value of the respective touch point located in the first sub-display region obtained by the second touch chip; and
- comparing, by the second touch chip, the difference with the preset threshold to determine whether the difference is greater than the preset threshold for the respective touch point located in the first sub-display region.

* * * * *